(12) United States Patent
Balandin

(10) Patent No.: US 9,039,015 B2
(45) Date of Patent: May 26, 2015

(54) VEHICLE STEERING ADJUSTMENT APPARATUS AND METHOD OF USE THEREOF

(71) Applicant: Alexander Balandin, Calgary (CA)

(72) Inventor: Alexander Balandin, Calgary (CA)

(*) Notice: Subject to any disclaimer, the term of this patent is extended or adjusted under 35 U.S.C. 154(b) by 0 days.

(21) Appl. No.: 14/267,387

(22) Filed: May 1, 2014

(65) Prior Publication Data

US 2014/0239603 A1 Aug. 28, 2014

(51) Int. Cl.
*B62D 17/00* (2006.01)
*B60G 21/00* (2006.01)

(52) U.S. Cl.
CPC .............. *B62D 17/00* (2013.01); *B60G 21/007* (2013.01)

(58) Field of Classification Search
CPC ............................... B62D 17/00; B60G 21/007
USPC .................... 280/5.521, 5.522, 86.75, 86.751, 280/86.758, 5.514, 6.157; 180/411, 413; 701/41
See application file for complete search history.

(56) References Cited

U.S. PATENT DOCUMENTS

| | | | | |
|---|---|---|---|---|
| 4,267,896 A | * | 5/1981 | Hendriksen | 280/86.75 |
| 5,143,400 A | | 9/1992 | Miller et al. | |
| 5,351,555 A | * | 10/1994 | Garshelis | 73/862.335 |
| 5,964,814 A | | 10/1999 | Müller et al. | |
| 6,097,286 A | | 8/2000 | Discenzo | |
| 7,233,850 B2 | * | 6/2007 | Nakano et al. | 701/41 |
| 7,316,288 B1 | * | 1/2008 | Bennett et al. | 180/413 |
| 7,467,800 B2 | * | 12/2008 | Houser et al. | 280/5.521 |
| 7,873,440 B2 | | 1/2011 | Horiuchi et al. | |
| 8,170,811 B2 | * | 5/2012 | Grab et al. | 702/44 |
| 8,317,003 B2 | * | 11/2012 | Michel | 188/321.11 |
| 2007/0290473 A1 | * | 12/2007 | Buma | 280/124.106 |
| 2011/0048834 A1 | * | 3/2011 | Roeder | 180/252 |
| 2014/0175763 A1 | * | 6/2014 | Kim et al. | 280/5.514 |

* cited by examiner

*Primary Examiner* — James English (57) ABSTRACT

A device for use in a vehicle steering system, said device comprising at least one actuator affixed to a wheel linkage of at least one wheel of said vehicle steering system. The actuator comprises a rotation assembly engagable with a first wheel linkage segment, an electric motor for actuating movement of the rotation assembly via a gear box and one or more sensors integrally contained in the actuator for sensing one or more parameters selected from the group consisting of force, speed, turns and rotation. Rotation of the rotation assembly actuates linear movement of said first wheel linkage segment into and out of said actuator to thereby adjust one or more wheel parameters of said at least one wheel, and wherein said one or more sensors provide real time data to an actuator control unit integral to said actuator to self-adjust rotational parameters of said rotation assembly.

22 Claims, 10 Drawing Sheets

VEHICLE STEERING ADJUSTMENT APPARATUS AND METHOD OF USE THEREOF

FIELD OF THE INVENTION

The present invention relates to a device for adjusting vehicle steering and a method of using said device to control and adjust vehicle steering.

BACKGROUND OF THE INVENTION

Vehicle steering has traditionally comprised of adjusting the vehicle wheels' toe angle, caster or camber or all three to direct travel of the vehicle. Camber caster, and toe are typically adjusted during maintenance of a vehicle. Toe angle is typically also constantly changed during driving by turning of the steering wheel, which motion is typically translated through the steering column to a steering gear box or steering rack that changes the angular position of the wheels.

Toe angle can affect steer angle as the suspension system is compressed or extended from straight position. These changes in toe angle can enhance steering or it can detract from vehicle performance depending on whether the wheel's toe angle follows the desired direction of travel or not. In straight ahead driving it is typically desirable for all four wheels to have a slightly toe-in orientation. In braking it is preferably that the front suspension be in compression and the rear suspension be in extension; this tends to result in a toe-out angle for all wheels. To correct this toe-out orientation, an active adjustment needs to be made to all wheels. For improved traction and steering stability while braking in a turn, it is desirable to have some wheels toe-in while other wheels toe-out.

In some cases, it may be desirable to adjust wheel toe angle of all four wheels to match one another, to improve turning fidelity and also to reduce drag and improve fuel consumption. In other cases, it may be preferably to adjust the toe angle of the rear or front wheels to oppose one another, for example to enhance braking speed and effectiveness. Adjustment and control of both of these aspects of the wheels' orientation are important to stable driving in a straight direction, as well as accurate turning.

U.S. Pat. No. 5,143,400 teaches an apparatus for active toe adjustment in which a complex system of measuring devices are used to sense vehicle motion or toe angle relative to each wheel. This data is then conveyed via a computer to a separate system comprising mechanical screw actuators and optical encoders, to then make secondary toe angle corrections.

U.S. Pat. No. 7,873,440 teaches an apparatus for controlling toe angle of a pair of wheels such that the wheel toe angles match one another. The apparatus includes an actuator and a separate sensor on each of only two wheels on a vehicle. The system is not designed for independent movement of all wheels of a vehicle to individual toe angles.

A need therefore exists in the art for a convenient and accurate system of vehicle toe angle and camber adjustment.

SUMMARY OF THE INVENTION

A device for use in a vehicle steering system, said device comprising at least one actuator affixed to a wheel linkage of at least one wheel of said vehicle steering system. The actuator comprises a rotation assembly engagable with a first wheel linkage segment, an electric motor for actuating movement of the rotation assembly via a gear box and one or more sensors integrally contained in the actuator for sensing one or more parameters selected from the group consisting of force, speed, turns and rotation. Rotation of the rotation assembly actuates linear movement of said first wheel linkage segment into and out of said actuator to thereby adjust one or more wheel parameters of said at least one wheel, and wherein said one or more sensors provide real time data to an actuator control unit integral to said actuator to self-adjust rotational parameters of said rotation assembly.

A method is further provided for adjusting vehicle steering. The method comprises providing at least one actuator to a wheel linkage of at least one wheel of said vehicle said actuator comprising, a rotation assembly engagable with a first wheel linkage segment, an electric motor connected to the rotation assembly via a gear box and one or more sensors integrally contained in the actuator, rotating the rotation assembly to actuate linear movement of said first wheel linkage segment into and out of said actuator to thereby adjust one or more wheel parameters of said at least one wheel and relaying real time data from said one or more sensors to an actuator control unit integral to said actuator to self-adjust rotation of said rotation assembly. Data from collected by said one or more sensors is selected from the group consisting of force, speed, turns and rotation.

DETAILED DESCRIPTION OF THE PREFERRED EMBODIMENTS

The present invention provides a wheel actuator for a vehicle that is electronically powered and self-adjusting. The present actuator can be affixed to any wheel linkage of each wheel to adjust such parameters as toe angle, camber, caster and vehicle height. The wheel linkage may be a steering linkage such as a tie rod, or a suspension linkage such as a strut, control arm or any other part of that connects the wheel to the vehicle suspension system or to the vehicle steering system.

The present actuators include integral force sensors to sense forces acting on a particular wheel and to detect changes in driving mode. Information from the force sensors is then fed back to the actuator to make self-adjustments in actuation to achieve the desired toe angle, vehicle height, wheel caster or wheel camber.

With reference to the Figures, one embodiment of the present actuator 2 is shown. The present actuator 2 is preferably an electrically driven, mechanical screw type or ball bearing type actuator that can be affixed to any and each modified wheel linkage of a vehicle wheel. For the purposes of toe angle adjustment, the present actuator 2 can be affixed around a modified tie rod having a first tie rod segment 4 connected to a wheel 50, and a second tie rod segment 6 that surrounds the first tie rod segment 4 at one end and is connectable to the vehicle suspension 56 or vehicle body 58 at the other end. At least a portion of the first tie rod segment 4 is preferably threaded 8. It would be well understood by a person of skill in the art that for adjustment and control of other wheel parameters, the actuator 2 may be affixed to any wheel linkage of any wheel of the vehicle, furthermore, one or more actuators may be affixed to one or more wheel linkages of a wheel.

Figure 5:
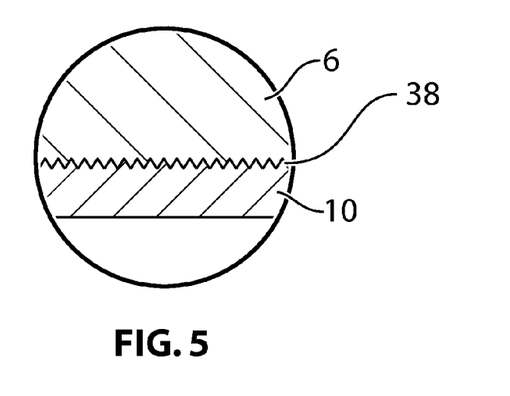
FIG. 5 is a detailed cross sectional view of a first end of the actuator housing of the present invention.
Figure 6A:
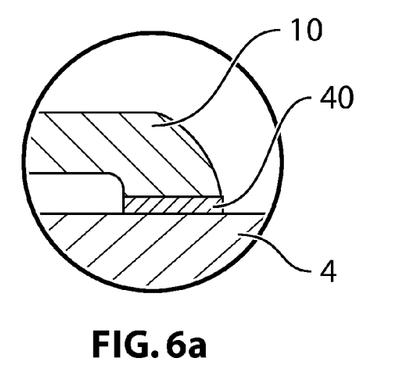
FIG. 6a is a detailed cross sectional view of a first embodiment of a second end of the actuator housing of the present invention.
Figure 6B:
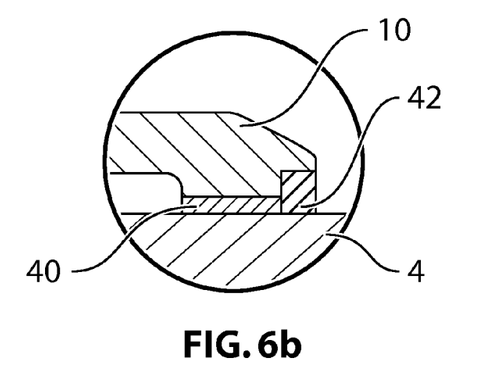
FIG. 6b is a detailed cross sectional view of a second embodiment of a second end of the actuator housing of the present invention.
Figure 6C:
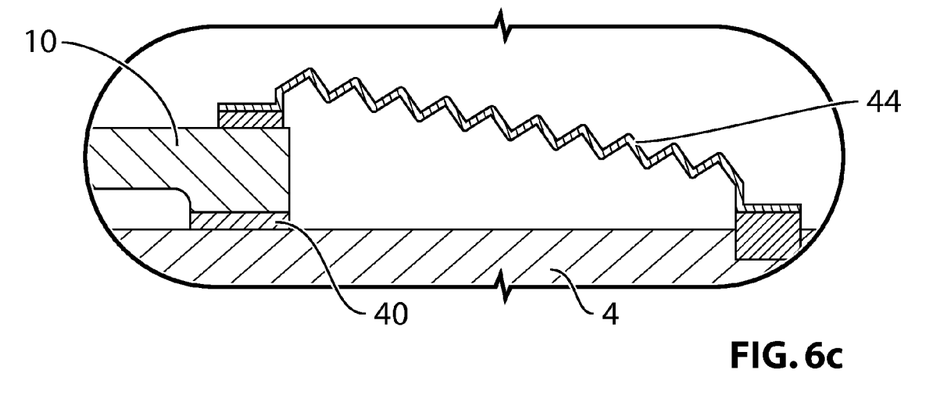
FIG. 6c is a detailed cross sectional view of a third embodiment of a second end of the actuator housing of the present invention.

The actuator 2 comprises an actuator housing 10 that contains all of the components of the actuator 2 and receives the first tie rod segment 4. The actuator housing 10 can be affixed to the second tie rod segment 6 in any number of means including threading, welding, friction fit. Most preferably the actuator housing 10 is threadably connected 38 to the second tie rod segment 6, as illustrated in FIG. 5, to thereby advantageously allow the actuator 2 to be removed if desired. Any number of arrangements can be made to allow for linear movement of the first tie rod segment 4 within the actuator housing 10, some of which are illustrated in FIGS. 6a to 6c, including a bushing connection 40 as shown in FIG. 6a, or a busing 40 combined with a seal 42 as illustrated in FIG. 6b, to keep debris from entering the actuator housing 10. FIG. 6c illustrates a bushing connection 40 in combination with a cover 44 to prevent ingress of debris into the first tie rod segment 4.

A rotation assembly 12 engages threaded portion 8 of the first tie rod segment 4 and is powered by means of an electric motor 14 connected via a gear box 16 to the rotation assembly 12. The electric motor 14 is controlled by an actuator control unit (ACU) 18, which are well known in the art. The ACU 18 receives data from the force sensors as well as from the vehicle's active suspension module 52. In one embodiment, depicted in FIG. 1, the electric motor 14, gear box, 16 and ACU 18 may be housed on the actuator 2 and more preferably covered by a cover 22 to prevent ingress of dirt and dust into these systems. In an alternate embodiment, illustrated in FIG. 2, the electric motor 14, gear box, 16 and ACU 18 may be located separately to actuator 2 and connected thereto by means of a cable 24.

Figure 3A:
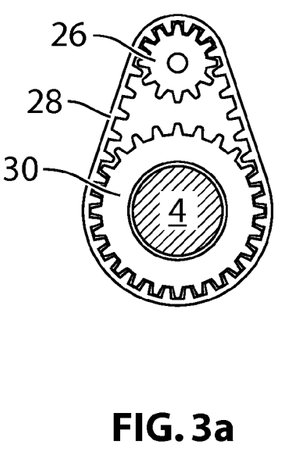
FIG. 3a is a cross sectional view of a first embodiment of the rotation means of the present invention.
Figure 3B:
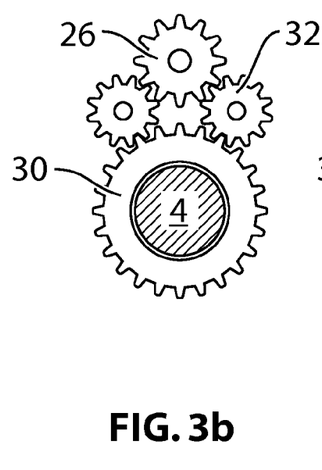
FIG. 3b is a cross sectional view of a second embodiment of the rotation means of the present invention.
Figure 3C:
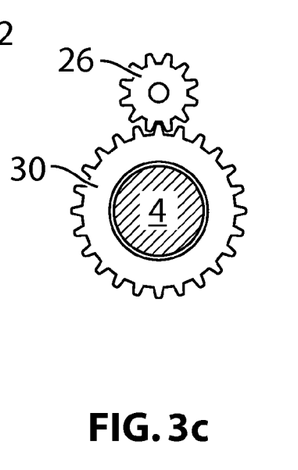
FIG. 3c is a cross sectional view of a third embodiment of the rotation means of the present invention.

With reference to FIGS. 3a, 3b and 3c, the rotation assembly 12 of the present invention can be of any form that successfully translates rotation force from the gear box 16 to the threaded portion 8 of the first tie rod segment 4 to result in linear movement of the first tie rod segment 4 into or out of the actuator housing 10. Such linear movement of the first tie rod segment 4 results in angling of the wheel 50. In most cases, a first gear 26 is connected to the gear box 16 and translates rotation force from the gear box by a number of mechanisms. For example, FIG. 3a shows the translation of rotation from first gear 26 via a belt 28 to a second gear 30 around the first tie rod segment 4. The internal surface of the second gear engages the threaded portion 8 of the first tie rod segment 4 to thereby linearly move the first tie rod segment 4 either into or out of the actuator housing 10. FIG. 3b shows an example in which translation of rotation from the first gear 26 is via a one or more corresponding third gears 32 to the second gear 30 around the first tie rod segment 4. FIG. 3c shows an example in which rotational force is directly transferred from the first gear 26 to the second gear 30 around the first tie rod segment 4.

Figure 7A:
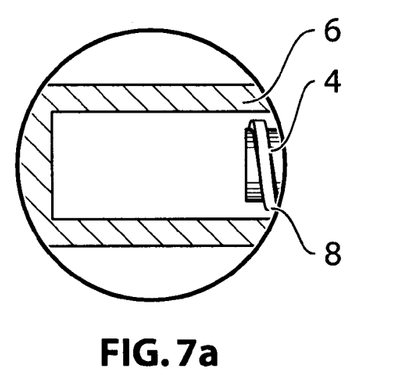
FIG. 7a is a detailed cross sectional view of a first embodiment of the arrangement between the first tie rod segment and the second tie rod segment of the present invention.
Figure 7B:
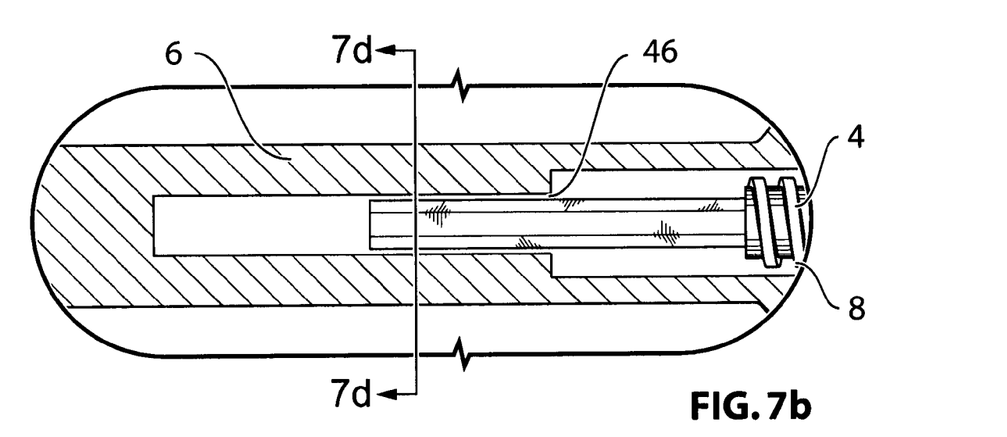
FIG. 7b is a detailed cross sectional view of a second embodiment of the arrangement between the first tie rod segment and the second tie rod segment of the present invention.
Figure 7C:
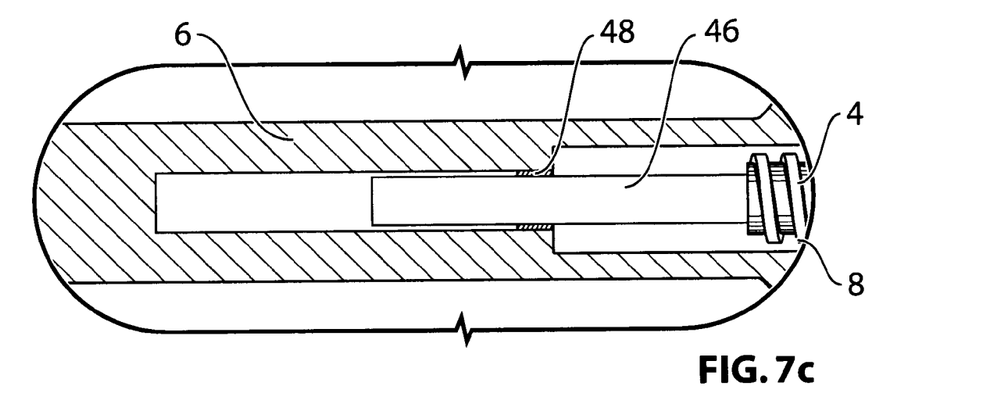
FIG. 7c is a detailed cross sectional view of a third embodiment of the arrangement between the first tie rod segment and the second tie rod segment of the present invention.
Figure 7D:
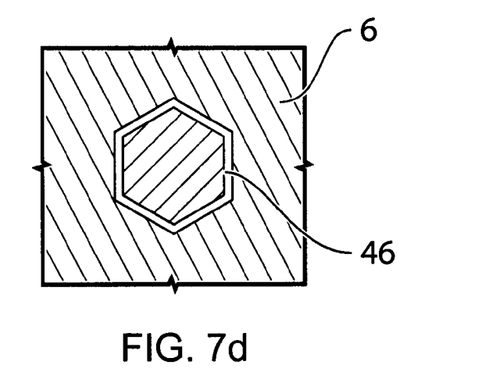
FIG. 7d is a detailed cross section view taken along line D-D of FIG. 7b.

Linear movement of the first tie rod segment 4 can be accommodated in the second tie rod segment 6 by any number of means, some of which are illustrated merely by example in FIGS. 7a to 7c. FIG. 7a illustrates a simple relationship in which sufficient annular space is provided between an outer diameter of the first tie rod segment 40 and the second tie rod segment 6 to accommodate such movement. In FIGS. 7b and 7d, a non-circular bolt and bolt hole arrangement 46 still allow for linear movement of the first tie rod segment 4 in the second tie rod segment 6, while preventing any rotation of the former in the latter, for example in the case of any form of breakage in the actuator that might cause the first tie rod segment 4 to spin. In FIG. 7c, a bolt and bolt hole in conjunction with a bushing 48 to prevent possible wear of either the first tie rod segment 4 or the second tie rod segment 6.

One or more force sensors 20 are preferably incorporated directly within the actuator 2 of the present invention and located adjacent the rotation assembly within the actuator housing 10. The force sensors 20 of the present invention can be of any type well known in the art to detect compressive and/or tensile forces or pressures. These force sensors 20 are more preferably arranged in pairs. The force sensors 20 detect compressive or tensional forces between the actuator body 2 and the rotation assembly 12; and between the second tie rod segment 6 and the rotation assembly 12. The compression or tension sensed by each force sensor 20 provides information on whether or not a particular wheel is resisting movement in the direction of desired steering. The force data can also provide an indication of wheel problems such as a loose or flat tire, which will lead to rapid fluctuations in forces or a force reading that is outside of normal steering operation. In this capacity, the present actuator can also provide suspension diagnostics information.

Force data collected from the force sensors 20 is returned to the ACU 18 and preferably also sent by the actuator 2 to the vehicle's controller area network (CAN) bus and to the vehicle's active suspension module 52.

Figure 1:
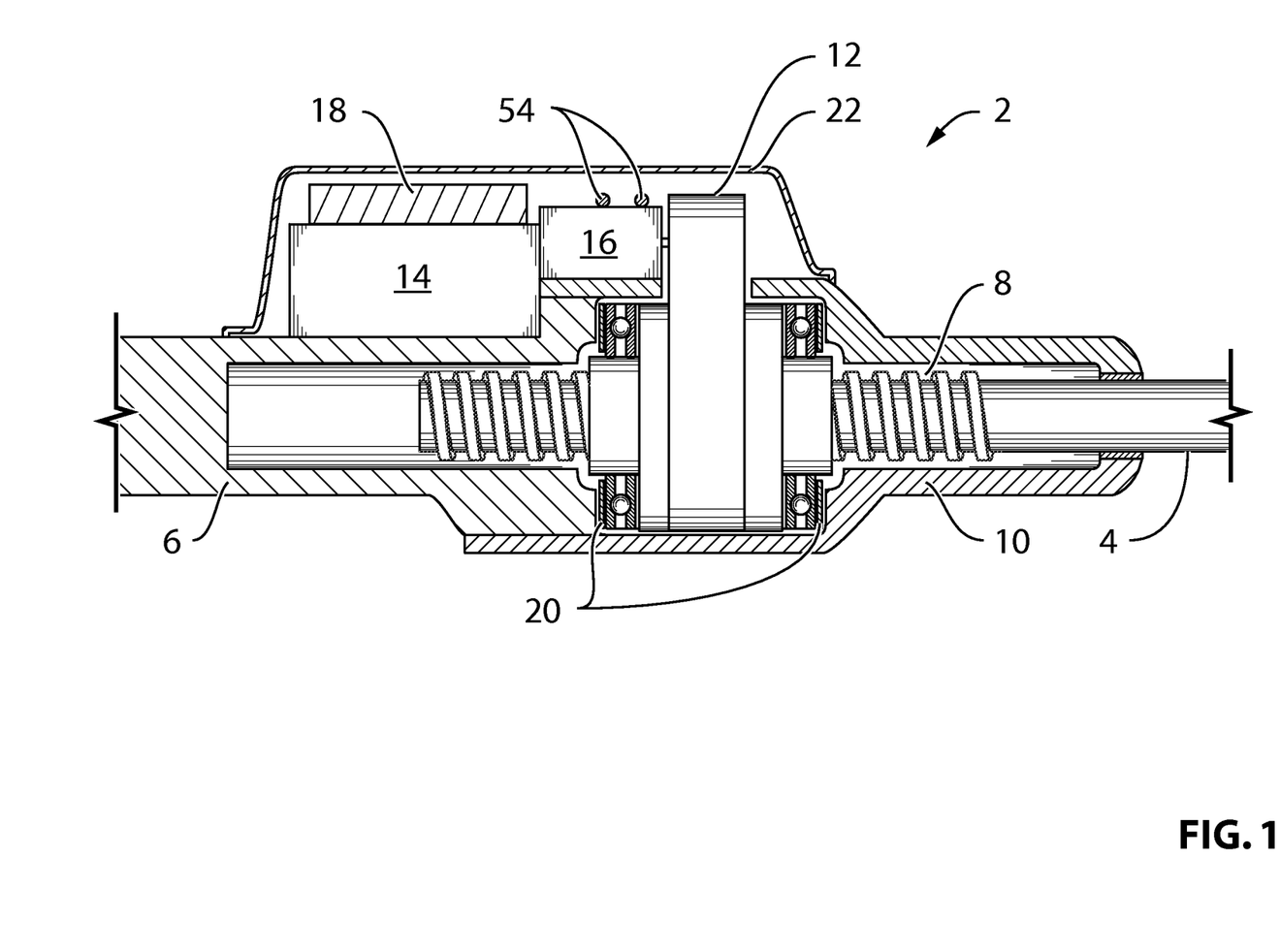
FIG. 1 is a cross sectional view of a first embodiment of the present invention.
Figure 2:
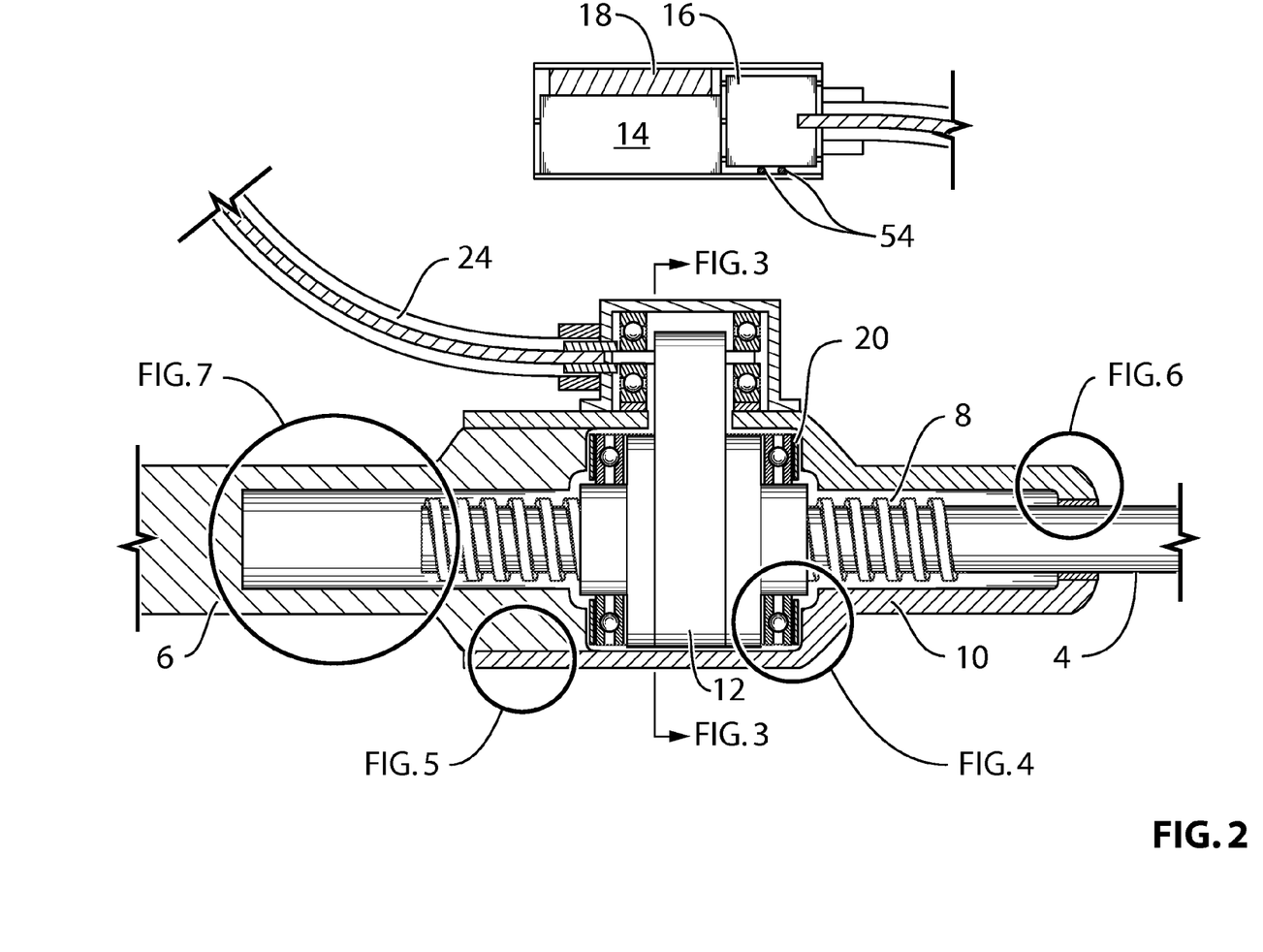
FIG. 2 is a cross sectional view of a second embodiment of the present invention.
Figure 4A:
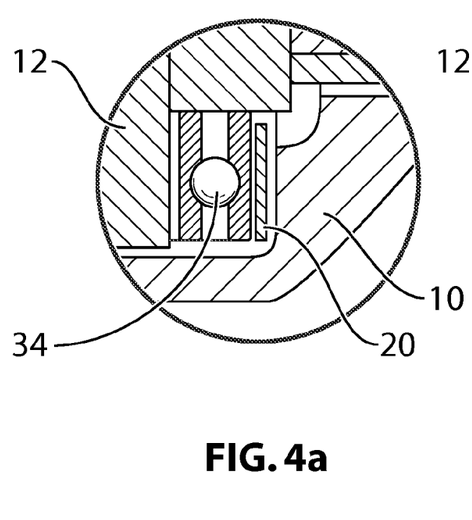
FIG. 4a is a detailed cross sectional view of a first embodiment of a force sensor of the present invention.
Figure 4B:
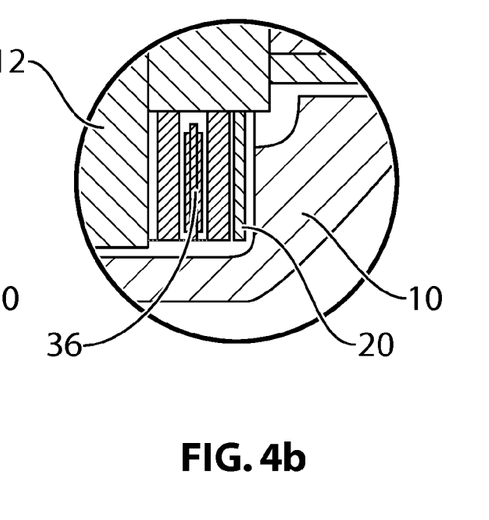
FIG. 4b is a detailed cross sectional view of a second embodiment of a force sensor of the present invention.

The force sensors 20 of the present invention may be of any type known in the art to sense compressive and tensional forces. As shown in FIGS. 1 and 2, preferably the force sensors 20 of the present invention are provided as a pair of force sensors 20 on either side of rotation assembly 12. Most preferably the force sensors 20 are placed on either side of the rotation assembly 12. With reference to FIGS. 4a and 4b, two preferred embodiments are shown for protecting the force sensor 20 from wear, friction, undesirable movement or breakage resulting from rotational movement of the rotation assembly 12. FIG. 4a illustrates a thrust ball bearing 34 placed between the rotation assembly 12 and the force sensor 20, and FIG. 4b illustrates a needle bearing 36 placed between the rotation assembly 12 and the force sensor 20.

One or more Hall sensors 54 are preferably also provided within the actuator 2 of the present invention, more preferably adjacent the gear box 16 and within the actuator cover 22. Alternately, as depicted in FIG. 2, the Hall sensors 54 may be located with the electric motor 14, gear box, 16 and ACU 18 separate to actuator 2 and connected thereto by means of a cable 24. Such Hall sensors 54 can be used to detect and determine parameters related to the gear box 16 including speed, rotation and number of turns of the gear box 16. Such data can then be fed back to the ACU 18 to determine if the actuator 2 is making proper adjustments to the wheel. While Hall sensors 54 are specifically referred to herein, it would be understood by a person of skill in the art that any number of other sensors that also detect rotation speed and act as turns counters could also be used without detracting from the scope of the present invention, including optical sensors, rate gyros and gyroscopes. Hall sensors are particularly preferred because they are not ill-affected by vibration or environmental contaminants.

The Hall sensors 54 of the present invention differ from conventional position sensors often used in the art, which simply provide positional data relative to an inputted initial position. In such cases, the sensors must always be calibrated to ensure that the initial position reading is accurate. No such initial adjustment is required to calibrate the present force sensors 20 or Hall sensors 54. Furthermore, the integration of the present force sensors 20 and Hall sensors 54 into the present actuator 2 provides more accurate wheel 50 and gear box 16 data than that which could be collected by separate or stand alone sensor systems.

Figure 8:
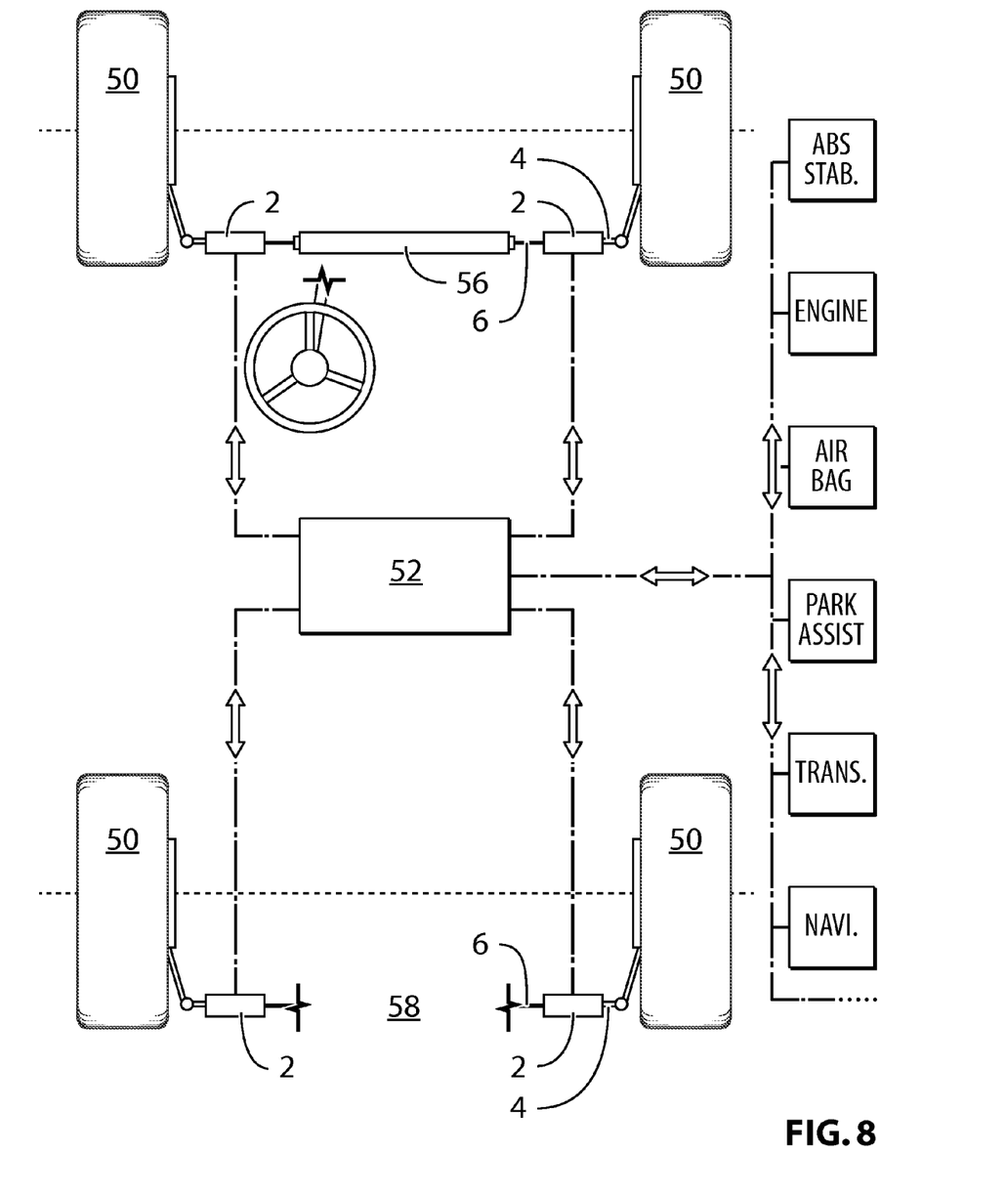
FIG. 8 is a schematic plan view of a first embodiment of a vehicle suspension system incorporating the system of the present invention.

With reference now to FIG. 8, a conventional set up of the present actuators on a vehicle is shown in which the steering wheel communicates with the vehicle's suspension 56 to direct steering of the vehicle. FIG. 8 illustrates a front wheel drive vehicle in which the rear wheels are connected to the vehicle body 58 through any standard linkage. The present actuators 2 are small enough that they can be affixed to each of the wheels 50 of the vehicle. Since the present actuators have integral force sensors 20 and preferably also integral Hall sensors 54, the present actuators 2 can receive real-time data on wheel position, speed, resistance to turn as well as gear box 16 parameters. This data is then fed back to the ACU 18 and used to self-adjust the actuation of the first tie rod segment 4 to provide continual assessment an adjustment of vehicle height, toe angle, caster or camber.

Data from the force sensor 20 and Hall sensor 54 can also optionally be sent by the actuator 2 to the vehicle's active suspension control 52 to be compared with data from all other wheels 50 to ensure all four wheels 50 are being adjusted as desired in relation to one another. Data can also be sent back to the actuator 2 from the active suspension control 52. Wheel data provided to the active suspension control 52 can also be sent to other vehicle systems, including but not limited to anti-lock braking systems (ABS), the engine, air bags and other safety systems, parking assist systems, vehicle transmission and navigation systems, to inform and adjust such systems.

Figure 9:
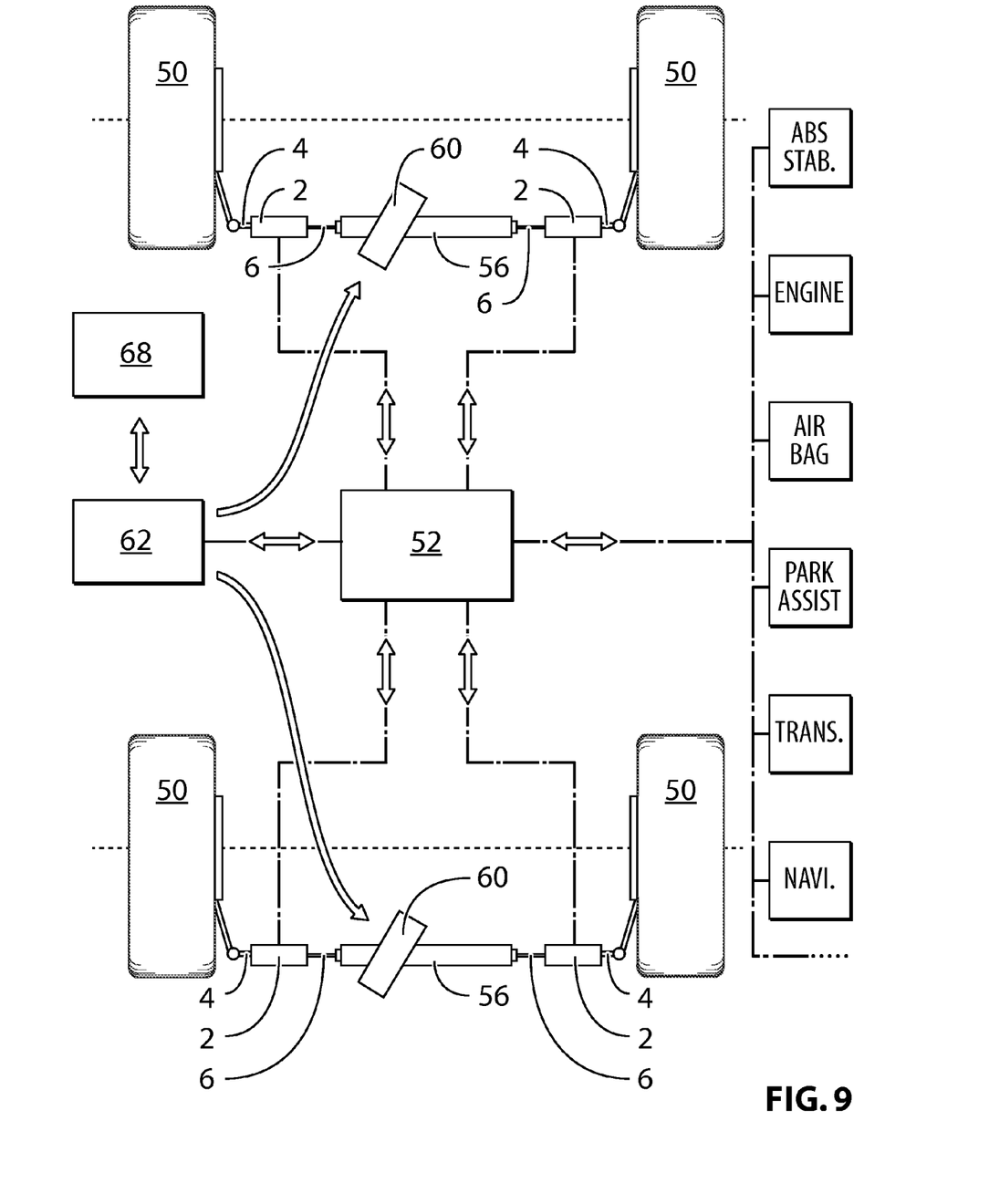
FIG. 9 is a schematic plan view of a second embodiment of a vehicle suspension system incorporating the system of the present invention.

With reference to FIG. 9, an alternate steering concept is illustrated, often referred to as 'steering by wire.' In steering by wire, electronics instead of hydraulic or mechanical systems are used to control steering of the vehicle. As such, a conventional steering wheel connected to the front wheels by a steering column would be replaced electronic signals sent to a steering motor 60 and actuate steering and turning of the wheels 50. In such cases, steering commands can be provided by any number of devices 68 including but not limited to a steering wheel, a joystick, a computer screen interface, a navigation system, buttons etc. via a steering module 62 to the steering motor 60 and vehicle suspension 56. In steering by wire, it is possible for the steering module 62 to command not only a steering motor 60 on the front wheels, but also on the rear wheels, thereby providing all wheel steering control of the vehicle.

The present actuator 2 can advantageously be used in a steering by wire arrangement. One or more of the present actuators 2 can be applied to one or more wheel linkages of each of the wheels 50 to provide data not only on the front wheels, but also to the rear wheels. The integral force sensors 20 and Hall sensors 54 of the present actuators 2 provide real time wheel 50 and gear box 16 data to the actuator 2 to provide a constant assessment and adjustment of the wheel toe angle. The present actuators 2 can additionally communicate force sensor 20 and Hall sensor 54 data with the steering module 62, via the active suspension control 52, to provide real time wheel 50 and gear box 16 data to inform the steering module's 62 commands to the steering motor, and also to send steering commands back to the actuators 2 to ensure a complete feedback loop. This provides full fidelity between the desired steering and driving action and the desired wheel toe angle of all wheels 50 that will achieve and enhance the desired action.

Two-way communication of data from the present actuator's 2 integral force sensors 20 and Hall sensor 54 is also possible between any number of secondary vehicle systems including, but not limited to anti-lock braking systems (ABS), the engine, air bags and other safety systems, parking assist systems, vehicle transmission and navigation systems. This two-way communication not only informs such systems on steering and toe angle, but also provides the present actuators 2 with information on any number of the vehicles other systems, alerting the actuator to abnormal behavior or failures of other systems. For example, brake or engine failure data or deployment of air bags can be sent to the actuators 2 which in turn will adjust wheel toe angles to assist in stopping the vehicle. Alternatively navigation and route programming data can be sent to the steering module 62 and the actuator 2 to self-steer a vehicle to a desired destination.

In steer-by-wire operation, the present actuator system can preferably be used as a backup system if the steer-by-wire system were to fail. In such case, the present actuators 2 with their internal force sensor 20 and Hall sensors 54 can take over steering operation and adjustment at limited speeds and in safe or emergency vehicle operation mode.

The present actuators 2 can further preferably be used in conjunction with a vehicle's navigation system, in which case a global positioning system (GPS) and mapping systems can be used to take a vehicle for a starting point to a programmed destination with none to little manual steering needed.

The present actuators 2 can also be useful in parking assist systems available in many vehicles. In this application, the present actuator system is able to turn wheels at certain desired toe angles to achieve parking in smaller parking spots.

Figure 10:
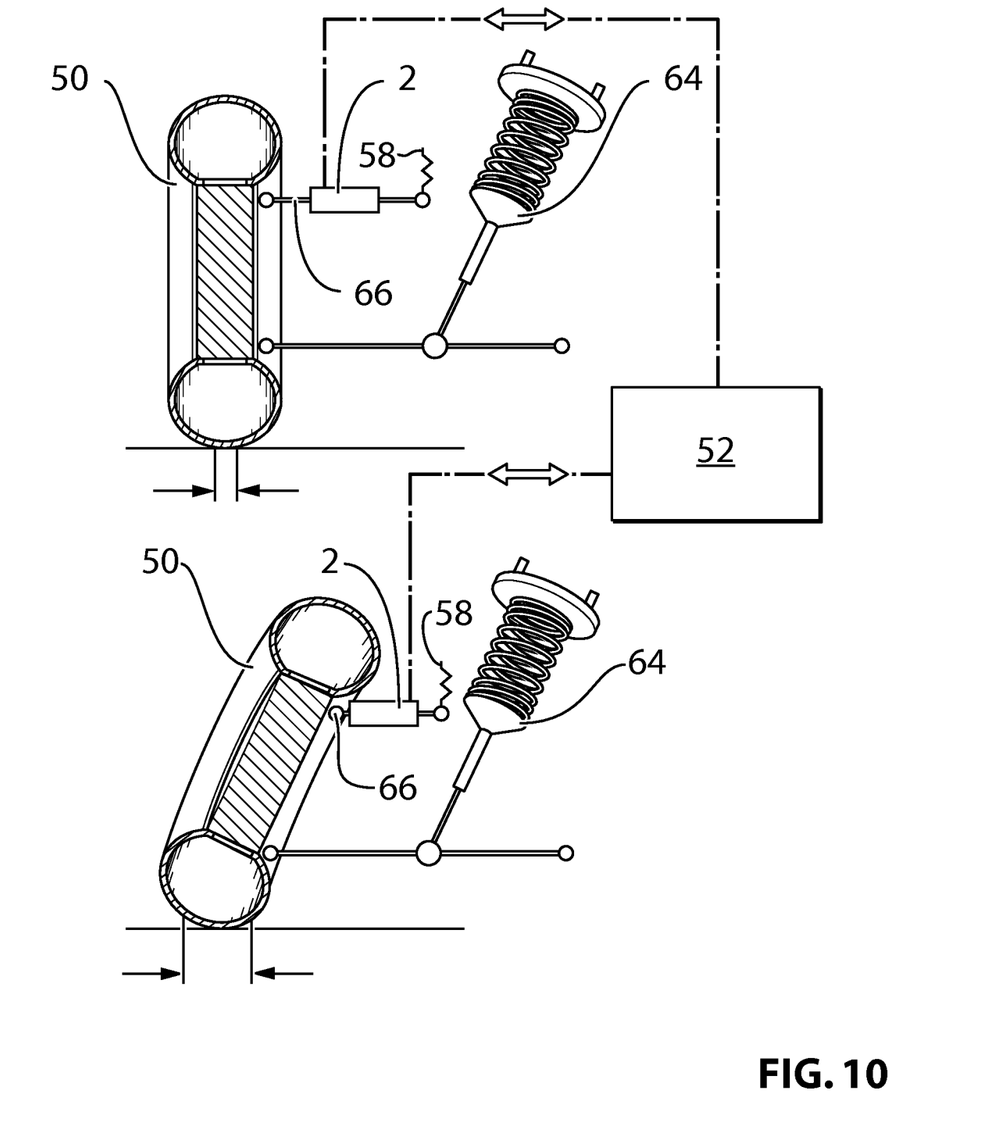
FIG. 10 is a schematic elevation view of one embodiment of the present invention, for use in wheel camber or castor adjustment and control.

The present actuators 2 can also be used to adjust wheel camber or caster, as illustrated in FIG. 10. In such cases one or more actuators 2 can be affixed to a control arm 66 that is connected at one end to an upper or lower portion the wheel 50 and at another end to the vehicle body 58 or sub frame. While FIG. 10 illustrates the actuator in relation to an upper portion of the wheel 50 it would be well understood by a person skill in the art that other connection locations on the wheel 50 are also possible and will achieve the result of camber adjustment and control when used with the present actuator 2. In this arrangement, actuation of the actuator 2 serves to draw in or draw out the control arm 66, moving in or out an upper or lower portion of the wheel, to thereby adjust camber or caster. As described previously, integral force sensors 20 and Hall sensors 54 provide real-time and constant feedback to both the rotation assembly 12 and to the active suspension control 52 to adjust rotation and thereby adjust and control the control arm 66 length.

With reference to FIG. 10, the upper wheel of this figure illustrates a camber position preferable for straight driving to achieve minimum friction and therefore also minimal fuel consumption. The lower wheel of FIG. 10 illustrates a camber and caster position preferable for turning or braking, where more friction may be needed to provide control.

Figure 11:
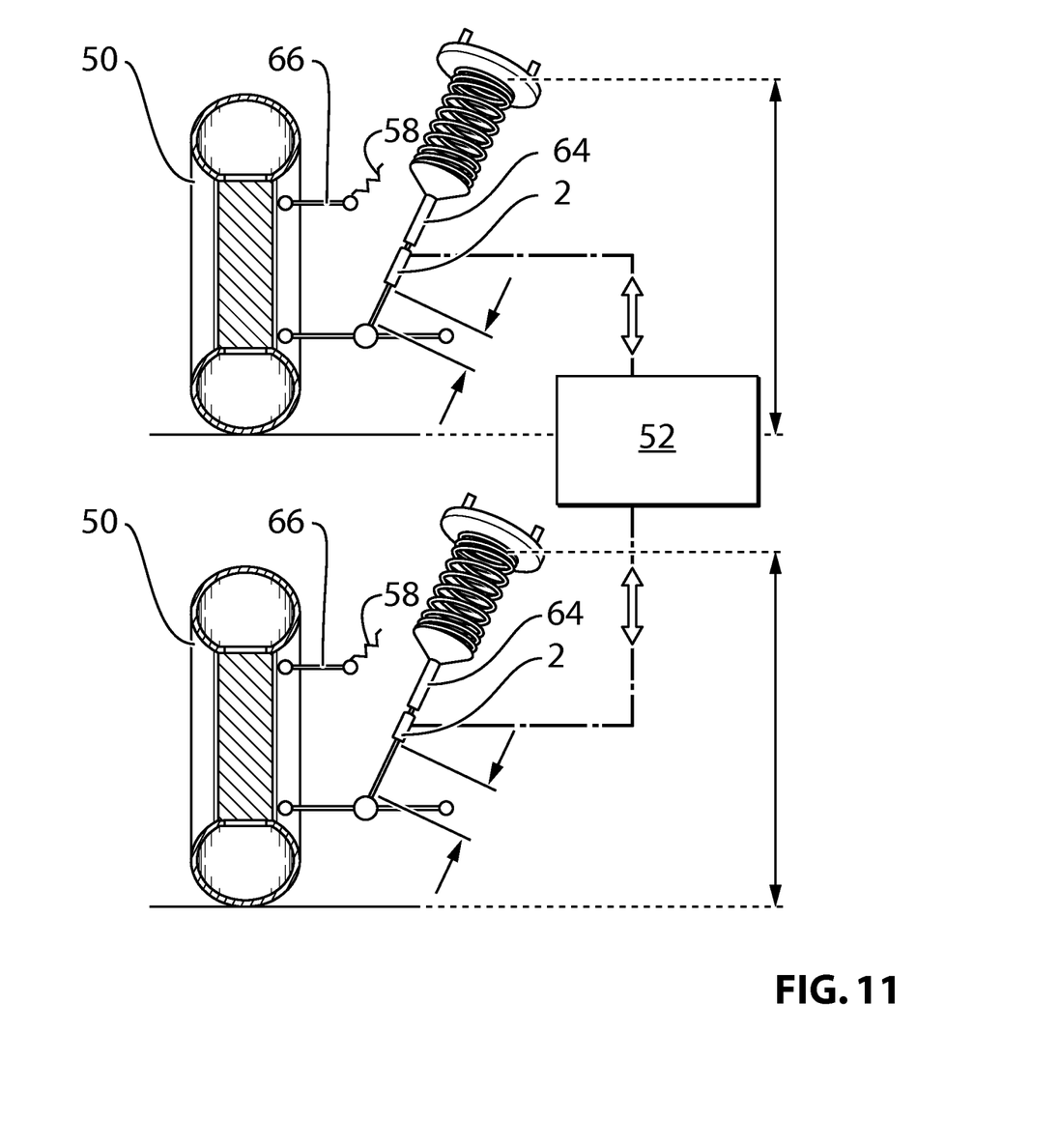
FIG. 11 is a schematic elevation view of one embodiment of the present invention, for use in vehicle height adjustment and control.
Figure 12:
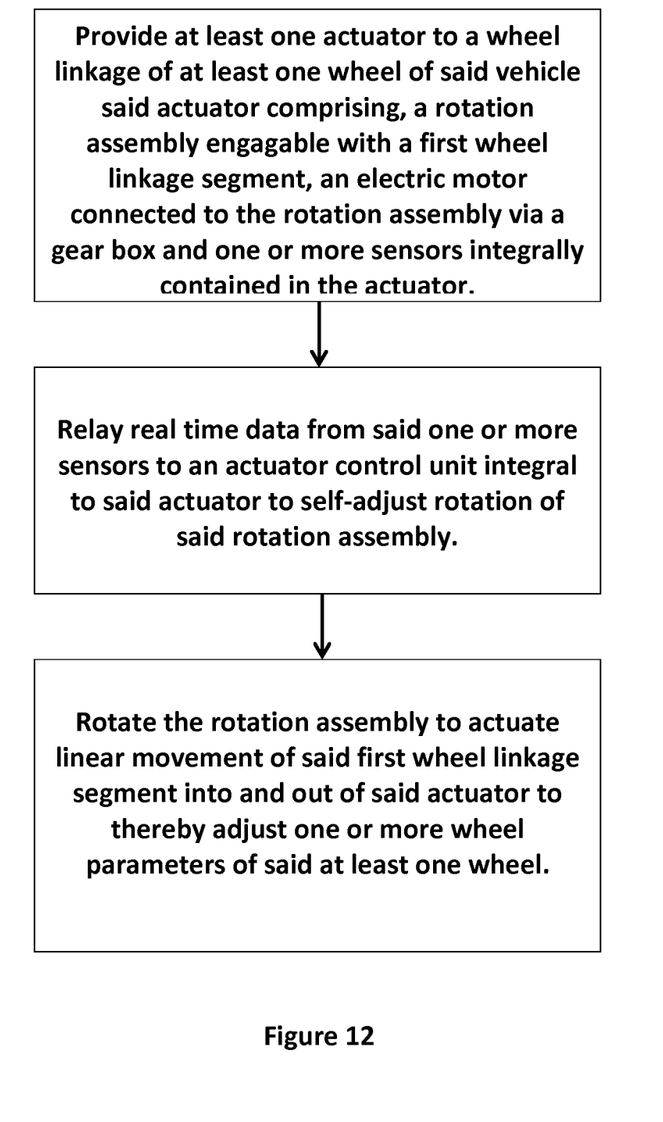
FIG. 12 is a schematic diagram of one method of the present invention.

With reference to FIG. 11, the present actuators 2 can also be used to adjust vehicle height. In such cases one or more actuators 2 can be affixed directly to a strut 64 that is linked via control arm 66 to an upper or lower portion the wheel 50 and connected to the vehicle suspension 56 or to the vehicle body 58. While FIG. 11 illustrates the actuator in relation to an upper portion of the wheel 50 it would be well understood by a person skill in the art that other connection locations on the wheel 50 are also possible and will achieve the result of vehicle height adjustment and control when used with the present actuator 2. In this arrangement, actuation of the actuator 2 serves to extend or contract the strut 64, which in turn raises or lowers the control arm 66, to thereby adjust the vehicle height. As described previously, integral force sensors 20 and Hall sensors 54 provide real-time and constant feedback to both the rotation assembly 12 and to the active suspension control 52 to adjust rotation and thereby adjust and control the control arm 66 position.

If any of the vehicle's wheels 50 are spinning or not making contact with the ground, the present actuators 2 can be actuated to extend those particular wheels 50 to make contact with ground or to retract other wheels to balance wheel contact of all vehicle wheels. The present actuators 2 can send wheel height data to the active suspension control 52 and to adjust car load, steering, ABS, and possibly also to engine transmission.

The present actuator system can further preferably be used for to balance a vehicle's weight distribution and brake force distribution in cases where the vehicle's dynamic stability control (DSC) and/or ABS is activated. In such cases, adjusting vehicle height on a chosen wheel serves to change the load on that wheel. This wheel load data can then be sent to the DSC system and can be used to adjust anti-lock braking, traction control and in some vehicles switch driving mode from two-wheel drive to all-wheel drive if needed.

Since more than one actuator 2 can be affixed to a particular wheel 50, vehicle height, toe angle, caster and camber may all be adjusted for a particular wheel 50 simply by installing the present actuators 2 on the wheel linkages of choice. As well vehicle height, camber, caster and toe angle may be adjusted and controlled as part of a conventional feedback system as illustrated in FIG. 8, or by a steer-by-wire system as illustrated in FIG. 9.

In the foregoing specification, the invention has been described with specific embodiments thereof; however, it will be evident that various modifications and changes may be made thereto without departing from the broader scope of the invention, which is limited only by the claims.

The invention claimed is:

1. A device for use in a vehicle steering system, said device comprising:
   a. at least one actuator affixed to a wheel linkage of at least one wheel of said vehicle steering system, said actuator comprising;
      i. a rotation assembly engagable with a first wheel linkage segment;
      ii. an electric motor for actuating movement of the rotation assembly via a gear box; and
      iii. one or more sensors integrally contained in the actuator for sensing one or more wheel parameters selected from the group consisting of force, speed, turns and rotation, wherein rotation of the rotation assembly actuates linear movement of said first wheel linkage segment into and out of said actuator to thereby adjust one or more wheel parameters of said at least one wheel, and wherein said one or more sensors provide real time data to an actuator control unit integral to said actuator to self-adjust rotational parameters of said rotation assembly.

2. The device of claim 1, wherein the actuator comprises an actuator housing connected to a second wheel linkage segment.

3. The device of claim 2, wherein the actuator housing is removably connected to the second wheel linkage segment.

4. The device of claim 2, wherein said one or more sensors comprise one or more force sensors to detect forces on the rotation assembly and relay force data to the electric motor to adjust rotation of the rotation assembly.

5. The device of claim 4, wherein said one or more force sensors comprise a pair of force sensors positioned on either side of the rotation assembly to detect compressive and tensional forces between the actuator housing and the rotation assembly and between the second wheel linkage segment and the rotation assembly.

6. The device of claim 5, further comprising one or more bearings positioned between each of said pair of force sensors and said actuator housing.

7. The device of claim 4, wherein the one or more sensors further comprise one or more rotational parameter sensors affixed to the gear box to detect rotational parameters of the gear box and to send rotational parameters to the electric motor to control rotation of the gear box.

8. The device of claim 7, wherein said one or more rotational parameter sensors are selected from the group consisting of Hall sensors, optical sensors, rate gyros, and gyroscopes.

9. The device of claim 8, wherein said one or more rotational parameter sensors are Hall sensors.

10. The device of claim 1, wherein the rotation assembly is of a form selected from the group consisting of a gear and belt assembly and a multiple gear assembly.

11. The device of claim 1, wherein said one or more wheel parameters are selected from the group consisting of toe angle, camber, caster and vehicle height.

12. The device of claim 1, wherein the wheel linkage is a tie rod and said actuator is actuated to adjust wheel toe angle.

13. The device of claim 1, wherein said wheel linkage is a control arm and said actuator is actuated to adjust wheel camber.

14. The device of claim 1, wherein said wheel linkage is a strut and said actuator is actuated to adjust vehicle height.

15. The device of claim 1, wherein the vehicle steering system is a conventional steering system in which data from the one or more sensors is further sent to and to a vehicle active suspension control system to compare wheel parameters of one or more vehicle wheels.

16. The device of claim 15, wherein data provided to the active suspension control is further sent to other vehicle systems, selected from the group consisting of anti-lock braking systems (ABS), engine, air bags, safety systems, parking assist systems, vehicle transmission, navigation systems and combinations thereof, to inform and adjust such systems.

17. The device of claim 15, wherein the actuator receives information from the other vehicle systems, to compare wheel parameters with information on other vehicle systems and adjust one or more wheel parameters in response to information received from other vehicle systems.

18. The device of claim 15, wherein data is communicated with a steering module via an active suspension control, to provide real time wheel and gear box data to inform the steering module's commands to a steering motor, and also to send steering commands back to the actuator to ensure a complete feedback loop.

19. The device of claim 14, wherein adjusting vehicle height on a chosen wheel serves to change the load on that wheel, a weight distribution and a brake force distribution of the vehicle.

20. The device of claim 19, wherein wheel load data can then be sent to a dynamic stability control system to adjust safety systems selected from the group consisting of anti-lock braking, traction control and driving mode.

21. A method for adjusting vehicle steering, said method comprising:
   a. providing at least one actuator to a wheel linkage of at least one wheel of said vehicle said actuator comprising, a rotation assembly engagable with a first wheel linkage segment, an electric motor connected to the rotation assembly via a gear box and one or more sensors integrally contained in the actuator;
   b. rotating the rotation assembly to actuate linear movement of said first wheel linkage segment into and out of said actuator to thereby adjust one or more wheel parameters of said at least one wheel; and
   c. relaying real time data from said one or more sensors to an actuator control unit integral to said actuator to self-adjust rotation of said rotation assembly, wherein, data from collected by said one or more sensors is selected from the group consisting of force, speed, turns and rotation.

22. The method of claim 21, further comprising relaying data collected by the one or more sensors to a vehicle active suspension control system to compare wheel parameters of one or more vehicle wheels in a conventional vehicle steering system.

* * * * *